United States Patent Office 3,403,555
Patented Oct. 1, 1968

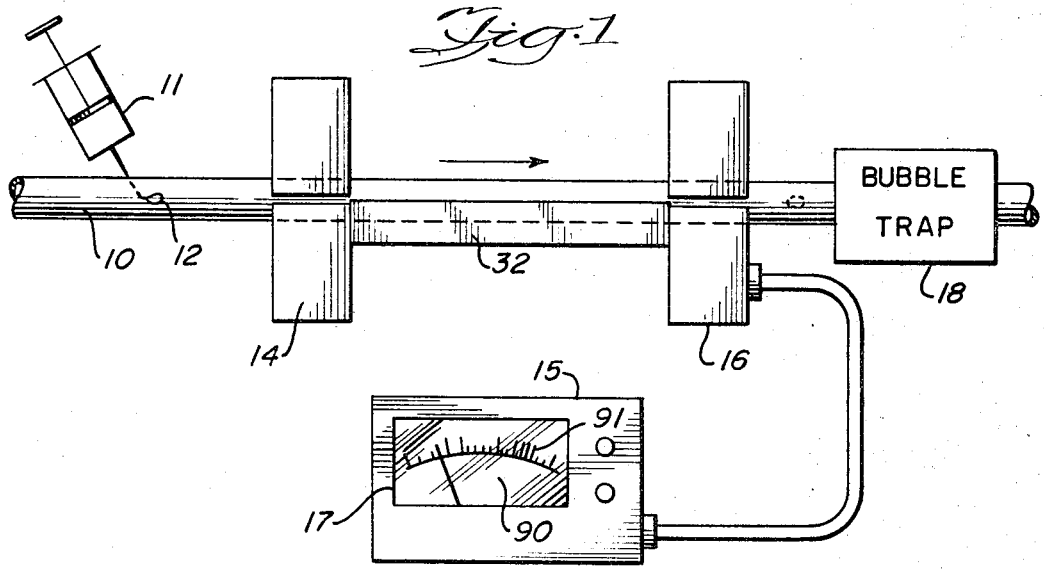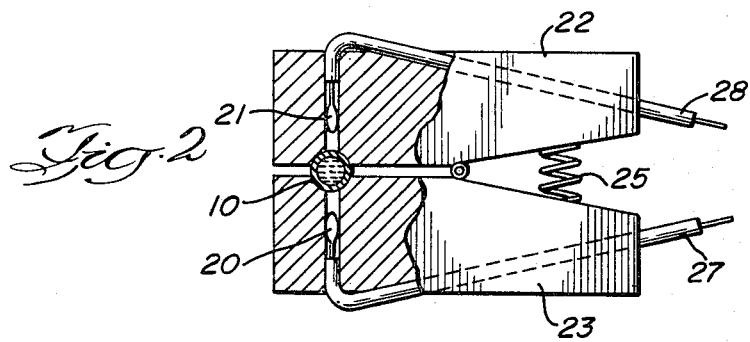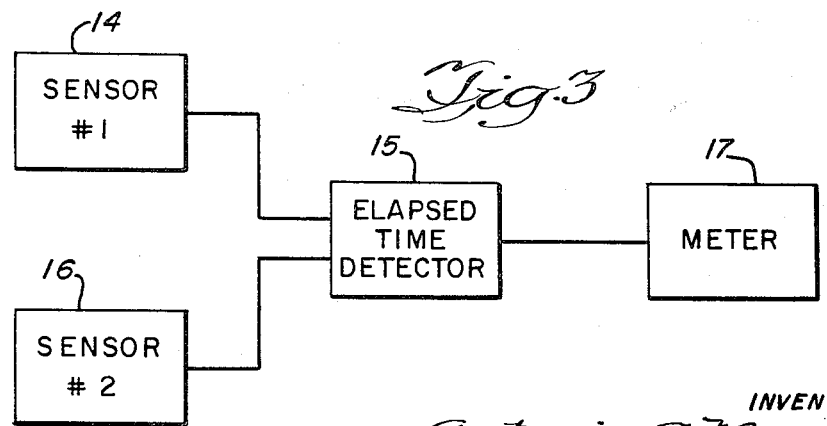

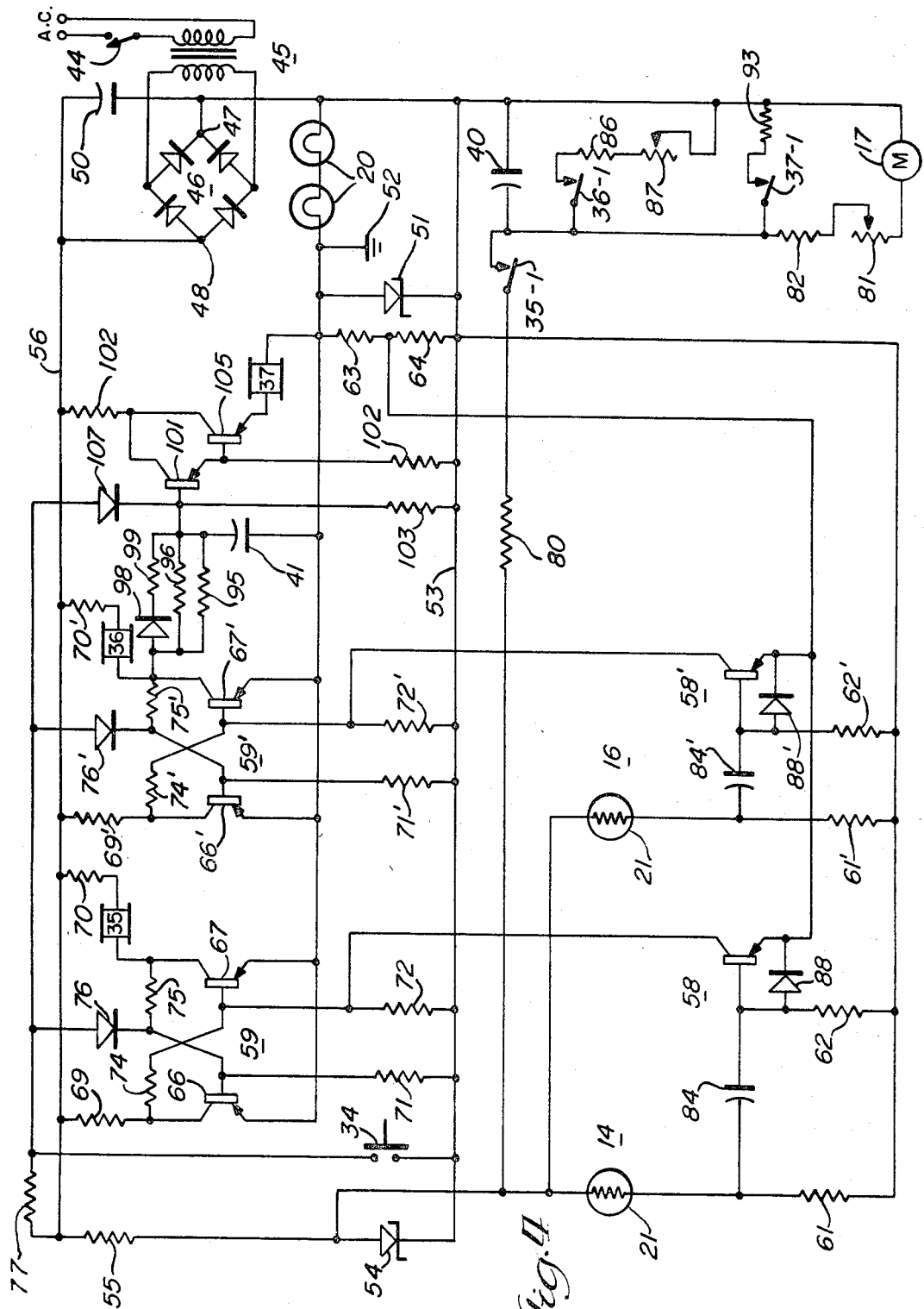
Fig. II

3,403,555
FLOWMETER
Antonio A. Versaci, Des Plaines, Ill. (25 Wildwood Road, Springfield, Ill. 62704), and Roelif Stapelfeldt, Houston, Tex.; said Stapelfeldt assignor to said Versaci
Filed July 18, 1966, Ser. No. 566,147
4 Claims. (Cl. 73—194)

ABSTRACT OF THE DISCLOSURE

A flowmeter which measures the rate of flow of a liquid through a conduit, by timing the passage of a bubble therethrough. A pair of spaced photoelectric detectors, connected to a timing circuit having a rate output, are mounted on a conduit support which establishes a known distance between the detectors.

---

This invention relates to a flowmeter, and more particularly to apparatus for determining the rate of flow of a liquid through a conduit.

The rate of flow of a liquid through a conduit is an important parameter which must be determined in many fluid flow applications. When contamination of the liquid cannot be tolerated, the rate of flow should be determined by a minimal amount of equipment in contact with the liquid itself.

For example, many medical procedures require the flow of a liquid, as blood, into the circulatory system of a patient. These procedures range in character from a simple transfusion or intravenous feeding to extracorporeal circulation in the utilization of an artificial heart or kidney. The rate of flow of the liquid is determined by the flowmeter disclosed and claimed herein, which measures the elapsed time needed for a substance, which is nonhomogenous with the liquid, to travel a fixed distance in the conduit. The elapsed time is converted into a rate of flow measurement.

One feature of the invention is the provision of apparatus which introduces a detectable substance into liquid flowing through a conduit. The time elapsed for the substance to travel a fixed distance in the conduit is measured and converted into a rate of flow indication.

Another feature of the invention is rate of flow apparatus which introduces a gas into the liquid, creating a bubble which is used for measurement purposes. When the liquid flows into the circulatory system of a patient, the apparatus includes means for removing the bubble from the flow stream after the measuring operation is completed.

A further feature of the invention is the provision of measuring apparatus which can be used with existing fluid flow conduits without breaking the conduit or inserting the measuring apparatus into the fluid flow stream.

Yet another feature of the invention is the provision of apparatus which determines the rate of flow of a liquid through a conduit and displays this parameter on an indicating device for a predetermined time period. After this time period elapses, the indicating device displays a reading different from the initial reading to indicate that a new measuring cycle may be initiated.

Further features and advantages of the invention will be apparent from the following specification and from the drawings, in which:

FIGURE 1 is a diagrammatic view of an apparatus embodying the invention;

FIGURE 2 is a side view, partly cross sectional, of a sensor in operative relation with the fluid flow conduit;

FIGURE 3 is a block diagram of the electrical circuit of the apparatus; and

FIGURE 4 is a schematic diagram of the circuit shown in block form in FIGURE 3.

For illustrative purposes, the invention will be described for use in the medical field, where contamination is a critical problem. However, the invention may be utilized in any liquid handling system where it is desired to determine the rate of flow of the fluid through a conduit.

It is common to use transparent glass or plastic tubing in the handling of blood or other liquids for administration to a patient. A bubble trap, of known configuration, is commonly employed to remove any bubbles from the fluid flow, since the passage of a bubble into the blood stream results in serious damage to or death of a patient. The present invention takes advantage of these facts and injects a bubble into the conduit upstream from the bubble trap. The rate of flow of the liquid is sensed by determining the time necessary for the bubble to flow a predetermined distance, without requiring the introduction of additional apparatus into the flow stream.

Turning now to FIGURES 1–3 of the drawings, a section 10 of conduit is shown which may be part of an extracorporeal circulatory system, or an infusion set, or the like. A bubble injector 11 introduces a bubble 12 into the fluid flow stream of conduit 10. The fluid is flowing in the direction indicated by the arrow in FIGURE 1, from left to right. When the bubble passes a first sensor 14, an elapsed time detector 15 begins to measure the passage of time. As the bubble passes a second sensor 16, the running of the measured time is stopped, and the rate of flow of the liquid through conduit 10 is directly displayed on a meter 17. A bubble trap 18 of known design, located downstream from the second sensor 16, removes bubble 12 from the fluid stream.

Bubble injector 11 introduces a gas, as air, into the liquid, thereby creating the bubble. Injector 11 may take the form of a hypodermic needle, as illustrated, or alternatively a three-way stop cock or the like. While the introduction of a gas into the liquid has been illustrated, the invention is also applicable for use with other substances which are nonhomogenous with the liquid, or immiscible, and which produce a detectable particle. Furthermore, while the use of bubble trap 18 has been described, in many non-medical applications the introduction of a bubble into a liquid flow stream produces no deleterious results, and in such applications bubble trap 18 may be eliminated.

Sensors 14 and 16 are of identical form, as illustrated in more detail in FIGURE 2. For a detailed explanation of the construction of the sensors, reference should be made to the copending application of Antonio A. Versaci, "Bubble Detector," Ser. No. 536,218, filed Mar. 15, 1966. For the purposes of the present invention, the following explanation is sufficient. A lamp 20 and a photocell 21 are mounted in the ends of a pair of holders 22 and 23. The holders are pivoted to each other at 24, and the ends holding the lamp and photocell are urged together by a spring 25. Lamp 20 and photocell 21 are received in bores which extend into the body of each of the holders from semicylindrical conduit engaging surfaces at the ends of each holder. From the lamp, light passes through the conduit and its contents to the photocell. Electrical connections are made to the lamp and photocell respectively by the pairs of wires 27 and 28.

With a continuous flow of liquid through conduit 10, a certain amount of light passes from lamp 20 to photocell 21. The intensity of this light and the electrical characteristics of the photocell depend on the light transmitting characteristics of the liquid flowing in the conduit. Upon the passage of a bubble through the conduit, the light transmission characteristics are momentarily increased, resulting in an increase in the level of light reaching the photocell. The change in light intensity is detected by the elapsed time detector 15 and utilized to indicate the passage of a bubble thereby.

As seen in FIGURE 1, the sensors 14 and 16 are spaced apart a fixed distance by a rigid semicircular trough 32 which is fixedly attached at each end to one of the sensors. The flexible conduit 10, which has a uniform cross section, rests snugly against the rigid trough and is clamped in place by the holders 22, 23 of each sensor. With this construction, the distance between the sensors is always constant since the conduit 10 cannot sag or bend; and since the cross sectional area is also constant, the liquid flows at a uniform speed between sensor 14 and sensor 16.

The electrical circuit for the apparatus, which is illustrated in block form in FIGURE 3, is shown in detail in FIGURE 4. During the course of the description of the circuit specific values and component types will be given for the various elements of the circuit. It is to be understood that this detailed information is given for the purpose of disclosing an operative embodiment of the invention and that the values and types are not critical.

To start a measuring sequence, a SPST switch 34 is momentarily closed, energizing both of a pair of relays 35 and 36 and deenergizing a relay 37. Contact 35–1 of relay 35 closes, charging a 150 microfarad capacitor 40 to approximately 10 volts. This causes meter 17 to read full scale. A slow discharge path is also formed by the closing of contact 36–1 of relay 36, however, contact 35–1 provides a quick charge path which maintains capacitor 40 fully charged.

When a bubble passes photocell 21 of sensor 14, relay 35 is deenergized, thereby opening the charging circuit for capacitor 40. The capacitor then discharges through relay contact 36-1 and its associated resistance, gradually reducing the meter indication with time. When the bubble passes photocell 21 of the second sensor 16, relay 36 is deenergized to open the capacitor discharge circuit. Meter 17 stops falling and its indication of the charge on capacitor 40 is proportional to the period of time that elapsed for the bubble to travel the fixed distance from the first to the second sensor. Since rate of flow is directly proportional to the time required for an object in a confined path to move between two fixed points, provided the cross sectional area of the path is constant, the face of meter 17 may be suitably marked with indicia which directly indicate the rate of flow of the liquid, as in cubic centimeters per minute (cc./min.), for example.

After a period of time has elapsed sufficient to read the meter, determined by the charging rate of a 500 microfarad capacitor 41, relay 37 is energized, closing its contact 37–1 to short capacitor 40, causing the meter indicator to fall to zero. When the rate of flow is again to be measured, the operator presses switch 34 to reset the circuit, and injects another bubble into the fluid stream.

Considering the circuit in more detail, power is supplied from a 120 volt A.C. source through power switch 44 to a step-down transformer 45. The nominal 12 volt output from a secondary of transformer 45 is coupled to a full wave rectifier 46 having output terminals 47 and 48 with full wave D.C. thereacross. A filter capacitor 50 shunts the output of the full wave rectifier.

A Zener diode 51 is coupled between output terminal 47 and a source of reference potential or ground 52. Zener 51 clamps line 53 to a potential of +3.1 volts. A second Zener diode 54, in series with a 100 ohm resistor 55, is coupled between line 53 and a negative power line 56 connected to output terminal 48 of the full wave rectifier. Zener 54 has a 10 volt drop thereacross, causing line 56 to have a −10.5 potential. The voltages available across the Zener diodes 51 and 54 are used to power the remainder of the circuit.

The detector circuit for sensor 14 includes the photocell 21, a photocell amplifier 58, and a bistable control multivibrator 59. Briefly, passage of a bubble past sensor 14 causes amplifier 58 to pass a negative pulse to change the condition of multivibrator 59, deenergizing relay 35.

The photocell 21, Claire type CL603, is connected across Zener diode 54 by a 4.7 kilohm resistor 61. The base of the photocell amplifier 58 is connected with the positive side of the Zener diode through a 33 kilohm resistor 62. The emitter of amplifier 58 is coupled to the junction of a pair of 47 ohm resistors 63, 64 which shunt Zener diode 51. Since the base is more positive than the emitter, the transistor is back biased, normally maintaining it in a nonconductive condition.

Bistable multivibrator 59 includes 2N404 transistors 66 and 67 which have their emitters connected to ground 52. The collector of transistor 66 is connected with the negative power line 56 through a 150 ohm resistor 69, while the collector of transistor 67 is connected with the negative line 56 through a 56 ohm resistor 70, and relay 35, which has a nominal resistance on the order of 90 ohms, providing a balanced multivibrator circuit. The bases of the transistors are connected with positive power line 53 through resistors 71 and 72, 15 kilohms each. The transistors are cross coupled by resistors 74 and 75, each 2200 ohms, one connected between the collector of each transistor and the base of the other transistor.

The collector of photocell amplifier 58 is directly connected with the base of transistor 67. Reset switch 34 is connected between positive line 53 and the base of transistor 66 by a diode 76. The anode of the diode is coupled through a 39 kilohm resistor 77 to the negative power line 56.

When the system is placed in operation, reset switch 34 is closed, applying a positive potential to the base of transistor 66, rendering it nonconductive and causing transistor 67 to conduct. This in turn energizes relay 35, closing contact 35–1 to complete a charging path for capacitor 40. This charging path includes capacitor 40, closed contact 35–1, and a 470 ohm resistor 80, coupled between positive power line 53 and the junction of Zener diode 54 and resistor 55. This path charges capacitor 40 to approximately 10 volts. Meter 17, having a full scale deflection when 10 microamperes flows therethrough, is connected as a voltmeter across capacitor 40 by a set potentiometer 81 and 1.15 megohm resistor 82 in series with the meter. Potentiometer 81 is adjusted at this time to cause meter 17 to have full scale deflection.

A bubble is now injected into conduit 10 by injector 11, seen in FIGURE 1. As this bubble passes sensor 14, more light momentarily reaches the photocell 21, decreasing its resistance. A negative pulse appears at the junction between resistor 61 and photocell 21 and is coupled through a 50 microfarad capacitor 84 to the base of transistor 58, causing it to condut, and in turn applying a positive potential to the base of transistors 67. This cuts off transistor 67, deenergizing relay 35. Therefore, relay contact 35–1 opens to disconnect the charging circuit across capacitor 40. At the same time, transistor 66 is rendered conductive to clamp transistor 67 in its nonconducting condition.

Since relay 36 remains at this time energized, closing its contact 36–1, a slow discharge path consisting of a 33 kilohm resistor 86 in series with a 5 kilohm variable resistor 87 is connected across capacitor 40, causing it to slowly discharge, without being immediately recharged as was true when relay contact 35–1 was closed. As the charge on capacitor 40 slowly dissipates, the dial of meter 17 slowly falls from full scale deflection, in proportion to the voltage across capacitor 40, which in turn is proportional to the time the discharge path is effective to discharge capacitor 40.

Diode 88, connected across the base emitter junction of transistor 58 cooperates to provide a low impedance charging path for capacitor 84. This establishes a stable operating condition for the system when it is first turned on.

The detector circuit for sensor 16 is identical in structure and operation to the detector circuit 14. Therefore, the parts forming the detector circuit for sensor 16 which correspond with the same parts for sensor 14 have been indicated by the same reference numeral followed by a prime.

As the bubble passes photocell 21 of sensor 16, photocell amplifier 58' generates a positive pulse which is coupled to the base of the transistor 67' of multivibrator 59', driving transistor 67' nonconductive and deenergizing relay 36. This in turn opens relay contact 36–1, disconnecting the discharge circuit from capacitor 40 to maintain the scale reading of meter 17 at the instant the bubble passes. The voltage indicated by meter 17 is directly proportional to the elapsed time, because capacitor 40 has discharged an amount proportional to the time needed for the bubble to travel in a constant cross sectional tube the fixed distance between sensors 14 and 16. Since rate of movement of a liquid in a confined path of constant cross section is directly proportional to the time it takes an object flowing at essentially the speed of the liquid to pass between fixed points, the scale 90 of meter 17, as illustrated in FIGURE 1, may be marked with indicia 91 which directly indicate rate of flow in cc. per minute.

After a length of time has passed suitable for an operator to read meter 17, relay 37 is energized, as will appear, closing contact 37–1 to connect a 56 ohm resistor 93 directly across capacitor 40. This discharge path causes the charge retained across capacitor 40 to dissipate, returning the pointer indicator of meter 17 to zero. Meter 17 continues to read zero after this time, indicating to an operator the completion of the measuring operation.

The amount of time which elapses after the bubble passes sensor 16 and before relay 37 is energized is proportional to the charge on the capacitor 41. A charge-discharge path is formed between capacitor 41 and the collector of transistor 67', consisting of parallel connected 68 kilohm resistor 95, 47 kilohm resistor 96, and a series connected diode 98 and 470 ohm resistor 99. It will be recalled that during the time the bubble is traveling toward the second sensor 16, transistor 67' of multivibrator 59' is conductive and energizes relay 36. This conductive transistor also shunts capacitor 41, discharging any residue charge previously retained thereon. Since diode 98 is poled in the same direction as the current flow through conducting transistor 67', the dominant impedance across capacitor 41 is the low value resistor 99, and the capacitor is rapidly discharged.

The junction of capacitor 41 with resistors 95, 96, and 99 is coupled to the base of a 2N465 transistor 101. The collector of transistor 101 is coupled through a 56 ohm resistor 102 to the negative power line 56. The emitter of transistor 101 is coupled through a 47 kilohm resistor 102 to positive power line 53. Similarly, the base of transistor 101 is also coupled through a 47 kilohm resistor 103 to the same positive power line 53. Since the emitter and base of transistor 101 are coupled to the same voltage source when capacitor 41 is discharged, transistor 101 is normally nonconductive.

A 2N404 transistor 105 is connected between transistor 101 and relay 37. The collector and base of transistor 105 are respectively coupled to the collector and emitter of transistor 101. The emitter of transistor 105 is directly coupled through relay 37 to ground 52. Since the base of transistor 105 is coupled to +3.1 volts, while the emitter is coupled to ground 51, transistor 105 is also normally nonconductive, causing relay 37 to be deenergized.

When the bubble passes the second sensor 16, transistor 67' is rendered nonconductive. Therefore, the voltage at the collector of transistor 67, which had been clamped by the conducting transistor to essentially ground potential, quickly rises to the −10.5 volts on power line 56. Since diode 98 is back biased by this voltage, a slow charge path for capacitor 41 is formed only through paralleled resistors 95 and 96, causing an increasingly negative potential to slowly accumulate across capacitor 41. This negative potential, which is directly coupled to the base of transistor 101, causes transistor 101 to almost immediately conduct. However, the potential on the base of transistor 105 is still initially more positive than the ground potential on the emitter of transistor 105, and hence transistor 105 remains nonconductive.

The rising negative potential across capacitor 41 is directly coupled to the base of transistor 105 through transistor 101, less a small voltage drop across the emitter-base junction. As the negative voltage rises above a value sufficient to cancel the positive voltage through resistor 102, transistor 105 is rendered conductive, thereby energizing relay 37 and closing contact 37–1 to discharge capacitor 40. Since the energization of relay 37 has no effect on multivibrator 59', transistor 67' remains nonconductive at this time and hence the negative voltage across capacitor 41 continues to rise, further driving transistors 101 and 105 into their conducting state to maintain relay 37 energized.

A diode 107 is coupled between the base of transistor 101 and switch 34. When an operator is ready to begin a new measuring cycle, he depresses switch 34, thereby energizing relays 35 and 36 as previously explained. At the same time, diode 107 passes the positive potential so produced to the base of transistor 101, cutting it off, thereby driving transistor 105 nonconductive to deenergize relay 37. The conducting transistor 67', diode 98 which is in circuit only during discharge, and the low value resistor 99 also quickly dissipate the charge across capacitor 41. Capacitor 40 now immediately charges to 10 volts, causing meter 17 to be fully deflected. The injection of a bubble into the fluid stream will now initiate another automatic measuring cycle.

While I have shown and described certain embodiments of my invention, it is to be understood that it is capable of many modifications. Changes, therefore, in the construction and arrangement may be made without departing from the spirit and scope of the invention as disclosed in the appended claims.

We claim:

1. Apparatus for determining the rate of flow of a liquid through a conduit, comprising: means for introducing into the liquid a detectable substance; means for measuring the time elapsed for the substance to travel a fixed distance, including first and second substance detectors adjacent said conduit and spaced apart said fixed distance, and timing means activated when the substance passes the first detector and deactivated when the substance passes the second detector to determine the elapsed time, said timing means including a capacitor having a charge and a first switching circuit responsive to the detection of said substance by said first detector to disconnect a charging circuit connected to said capacitor, and circuit means effective when said substance is detected by the first detector to vary the charge in proportion to time, comprising a discharge path for said capacitor, a second switching circuit responsive to the detection of said substance by said second detector to disconnect the discharge path for said capacitor and connect a charging path to a second capacitor, and a third switching circuit activated by a predetermined voltage across said second capacitor to dissipate the remaining charge on the first named capacitor; and means for converting elapsed time into a rate of flow indication.

2. The apparatus of claim 1 including means for resetting the first, second, and third switching circuits to their initial condition.

3. Apparatus for determining the rate of flow of a liquid through a conduit, comprising: means for introducing into the liquid a detectable substance; means for measuring the time elapsed for the substance to travel a fixed distance, including means supporting said conduit along a path substantially equal to said fixed distance and preventing said conduit from bending out of said path, said supporting means having a surface extending along said path, said surface having a cross section which conforms with the cross section of said conduit, including first and second substance detectors fixedly attached at opposite ends of said supporting means, each of said detectors having a movable portion which clamps over the conduit to hold said conduit against said surface, and means for converting the elapsed time into a rate of flow indication.

4. The apparatus of claim 3 for a transparent flexible conduit, wherein the detectable substance is a gas, creating a bubble in the liquid, said first and second substance detectors each comprise a photoelectric cell and a source of light mounted on opposite sides of the conduit with the light directed through the liquid to the photoelectric cell opposite thereto, whereby the passage of the bubble past the detectors changes the light transmitting characteristics of the liquid, and said supporting means comprises a rigid trough having a concave channel which conforms with the cross section of said conduit, thereby causing said bubble to travel said fixed distance between said detectors.

References Cited
UNITED STATES PATENTS

| | | | |
|---|---|---|---|
| 2,640,936 | 6/1963 | Pajes | 73—194 |
| 3,323,362 | 6/1967 | Wells | 73—194 |
| 3,336,803 | 8/1967 | Thorndike | 73—194 |

FOREIGN PATENTS

| | | |
|---|---|---|
| 831,610 | 2/1952 | Germany. |
| 1,067,598 | 1/1954 | France. |

OTHER REFERENCES

Nash et al.: "An Automatic Recording Bubble Flowmeter," IRE Transactions on Medical Electronics, December 1959, pp. 274–276. (Copy in 73/194E.)

RICHARD C. QUEISSER, *Primary Examiner.*

E. D. GILHOOLY, *Assistant Examiner.*